(12) United States Patent
Tweedy et al.

(10) Patent No.: US 10,837,180 B2
(45) Date of Patent: Nov. 17, 2020

(54) PANEL STRUCTURE

(71) Applicant: HFW Solutions, Inc., Rapid City, SD (US)

(72) Inventors: Bryan Matthew Tweedy, Piedmont, SD (US); Chad Daniel Westendorf, Rapid City, SD (US); Casey Dean Allen, Rapid City, SD (US)

(73) Assignee: HFW SOLUTIONS, INC., Rapid City, SC (US)

( * ) Notice: Subject to any disclaimer, the term of this patent is extended or adjusted under 35 U.S.C. 154(b) by 0 days.

(21) Appl. No.: 16/249,413

(22) Filed: Jan. 16, 2019

(65) Prior Publication Data
US 2019/0218788 A1 Jul. 18, 2019

Related U.S. Application Data

(60) Provisional application No. 62/617,876, filed on Jan. 16, 2018.

(51) Int. Cl.
*E04F 13/08* (2006.01)
*F16B 11/00* (2006.01)
*E04F 13/12* (2006.01)
*B65D 19/00* (2006.01)

(52) U.S. Cl.
CPC ...... *E04F 13/0894* (2013.01); *B65D 19/0002* (2013.01); *E04F 13/12* (2013.01); *F16B 11/004* (2013.01); *B65D 2519/00024* (2013.01); *B65D 2519/00059* (2013.01); *B65D 2519/00273* (2013.01); *B65D 2519/00293* (2013.01); *B65D 2519/00323* (2013.01); *B65D 2519/00562* (2013.01)

(58) Field of Classification Search
CPC .. E04F 13/0894; E04F 13/12; B65D 19/0002; B65D 2519/00059; B65D 2519/00273; B65D 2519/00024; B65D 2519/00323; B65D 2519/00293; B65D 2519/00562; F16B 11/004; E04B 1/40; E04B 1/2403; E04B 1/54
See application file for complete search history.

(56) References Cited

U.S. PATENT DOCUMENTS

| | | | |
|---|---|---|---|
| 3,914,913 A | | 10/1975 | Roberts |
| 4,202,532 A | * | 5/1980 | Mills .................. E04B 2/60 256/24 |
| 6,397,551 B1 | | 6/2002 | Lewcock et al. |

* cited by examiner

Primary Examiner — Patrick J Maestri
(74) Attorney, Agent, or Firm — Gordon Rees Scully Mansukhani, LLP

(57) ABSTRACT

A panel structure including structural members connected together by a friction stir welding process. The structure includes a plurality of cross members, wherein each of the plurality of cross members is parallel to the other cross members in the plurality of cross members and wherein at least one of the plurality of cross members. An end cap member is positioned orthogonally to each of the plurality of cross members and connected to an end of each of the plurality of cross members. The end cap member includes a plurality of flanges, and each of the plurality of flanges includes a chamfered portion that fits within an opening at the end of one of the plurality of cross members.

16 Claims, 7 Drawing Sheets

PANEL STRUCTURE

CROSS REFERENCE TO RELATED APPLICATIONS

The present application claims priority to and the benefit of U.S. Provisional Patent Application No. 62/617,876 filed on Jan. 16, 2018. The foregoing provisional application is incorporated by reference herein in its entirety.

GENERAL DESCRIPTION

The present application relates to a panel structure to be employed as a deck, wall or another general wall or floor type supporting structure. The disclosed panel structure is especially suited as a cargo pallet, particularly a cargo pallet or a base floor of a container where the pallet and floor are constructed of metal rails.

A cargo pallet is a flat transport structure that supports goods in a stable fashion while being lifted by a forklift, pallet jack, front loader, work saver, crane, or other jacking device. Goods or shipping containers are often placed on a pallet secured with strapping, stretch wrap or shrink wrap and shipped. Cargo pallets can be made of wood, plastic, metal, or other materials. Cargo pallets may be assembled using multiple cross rails running parallel to one another that are joined together at their ends by end caps or end rails.

Cargo pallets made from aluminum have an advantage in that the metal panels used to assemble the cargo pallet are lightweight and malleable. The present application focuses on cargo pallets that are assembled using cross panels made from extruded aluminum that are welded together using a friction stir welding process. It should be understood that the technology discussed in the present application is not limited to only the use of extruded aluminum, and some of the innovative features disclosed herein are applicable to cargo pallets assembled using panels made from other types of materials. In addition, the panel structure disclosed herein may be employed as a wall, deck or other supporting structure.

When large structural members, beams or rails containing several multi-void hollows are assembled into a cargo pallet using friction stir welding or other joining techniques, it can be difficult to maintain flatness tolerances for the individual members or beams and the overall assembled panel during the assembly process. The joined members can exhibit transverse out-of-flatness conditions in a variety of modes, such as positive or negative bow, undulation or sharp kinks at the weld joints. The source of these geometric variations may be individual cross members that are out of flat, fit-up problems between the cross members, uneven weld shrinkage, improper clamping, etc. However, this situation can occur even when all the cross members individually are within specification.

As briefly discussed above, some types of panels used as cargo pallet include an end cap to join the cross members or beams together to form the pallet. If even one of the cross members is out of tolerance, it can be difficult to assemble or attach the end cap onto all of the cross members, either because the cross members are not flat, or because the cross members individually have thicknesses or deviations in their geometry that will not allow the end cap to be assembled and attached.

If the deviations of the individual cross members combine such that the joined cross members have a simple bow or other geometry that can be clamped flat, then at times it may be possible to apply clamping and finish the assembly of the pallet. However, much of the time the cross members have deviations that make it very difficult or impractical to assemble the end caps onto the cross members.

As noted above, the present application focuses on a cargo pallet assembled from cross members made of extruded aluminum, which can be susceptible to real life deviations in form such as flatness, straightness, size and thickness variation, as well as deviations in the features that make up the extruded cross members and the assembly as a whole. Pallets designed in the past have been assembled by relying exclusively on externally applied fixtures and clamping to make the pallet as flat as possible after assembly. It is common for the pallet assemblies to have tolerances that are much tighter overall than it would be possible to achieve by attempting to manufacture individual cross members that are flatter. In other words, just by the sheer act of joining the cross members (each having their own individual intrinsic tolerances), the final pallet assembly would end up being out of tolerance. In addition, clamping can cause distortions that make final assembly of the cargo pallet difficult.

To solve this problem, the inventors created an end cap with a structure and geometry that allows each individual cross member to conform to the shape of the straight end cap. With this geometry, the end cap can be inserted into the cross member more easily and straightens the cross member itself, potentially bringing the cross member into tolerance. Pallets manufactured in the past were not designed to facilitate the assembly of a pallet or to influence the form of the cross member by inserting an end cap, and instead placed end caps onto cross rails having a non-ideal geometry. Assembly and welding of the end cap onto the cross member usually requires that the member first be nearly flat, and that each of its features in cross-section be very near the nominal sizes.

The improved solution is able to accommodate non-ideal cross member geometry during assembly, due to tapered or chamfered portions near the cross member/end cap interface. When the end cap is inserted into the ends of the cross member, the member more easily aligns with the mating surfaces and if necessary, additional force can be used to press the end cap into place, which will necessarily conform the cross member more closely to the shape of the end cap. In an alternate embodiment, the tapered or chamfered portions of the end cap have additional relief slots or clearance slots built into them so that the internal features of the cross member will not interfere with assembly.

The end cap of the present application allows for more rapid panel assembly compared to previously manufactured panel structures, and also provides the potential for fewer weld defects and less weld distortion. In addition, the panel structure including the disclosed end cap design also minimizes the need for tight panel and assembly tolerances, and reduces the need for external clamping during assembly.

BRIEF DESCRIPTION OF THE DRAWINGS

FIG. 3 only shows a portion of the end cap and connected cross member.

DETAILED DESCRIPTION

Exemplary embodiments of this disclosure are described below and illustrated in the accompanying figures, in which like numerals refer to like parts throughout several views. The embodiments described provide examples, and should not be interpreted as limiting the scope of the invention. Other embodiments or modifications and improvements of the described embodiments are within the scope of the present invention.

Figure 1:
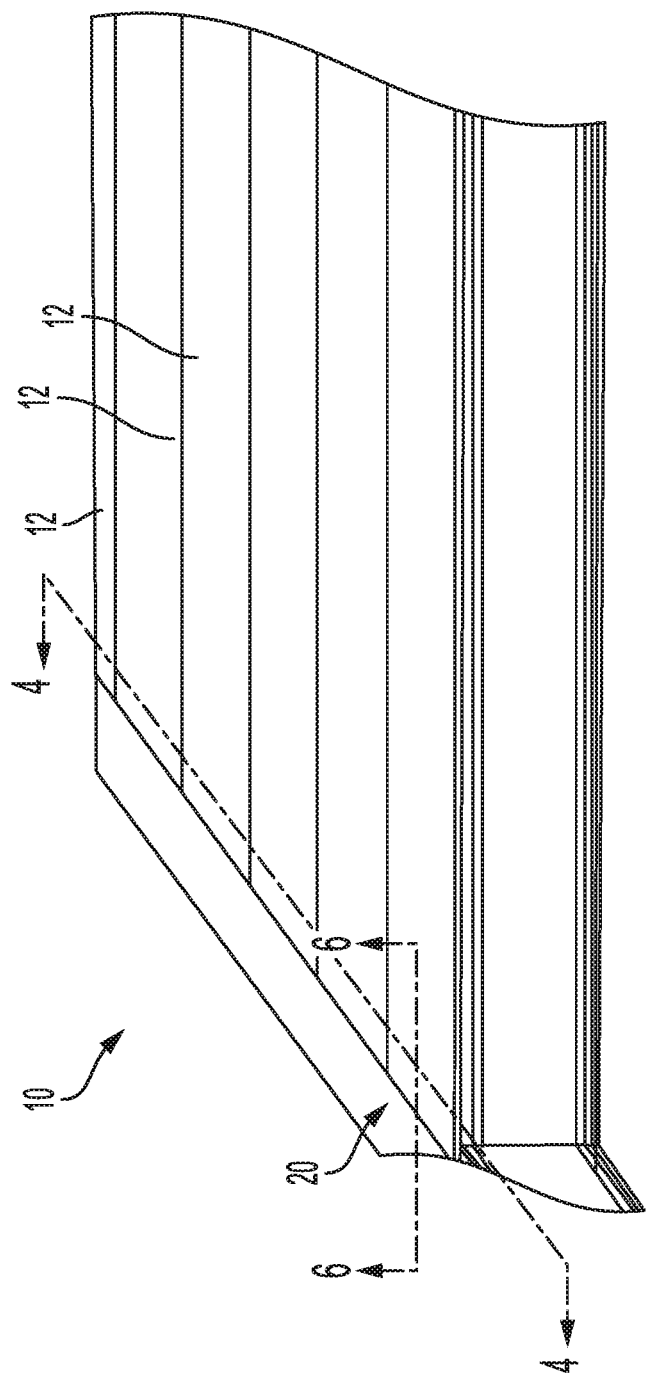
FIG. 1 is a top, front view of a portion of a panel structure according to a preferred embodiment, illustrating multiple cross members that are joined together at their ends by an end cap.
Figure 2:
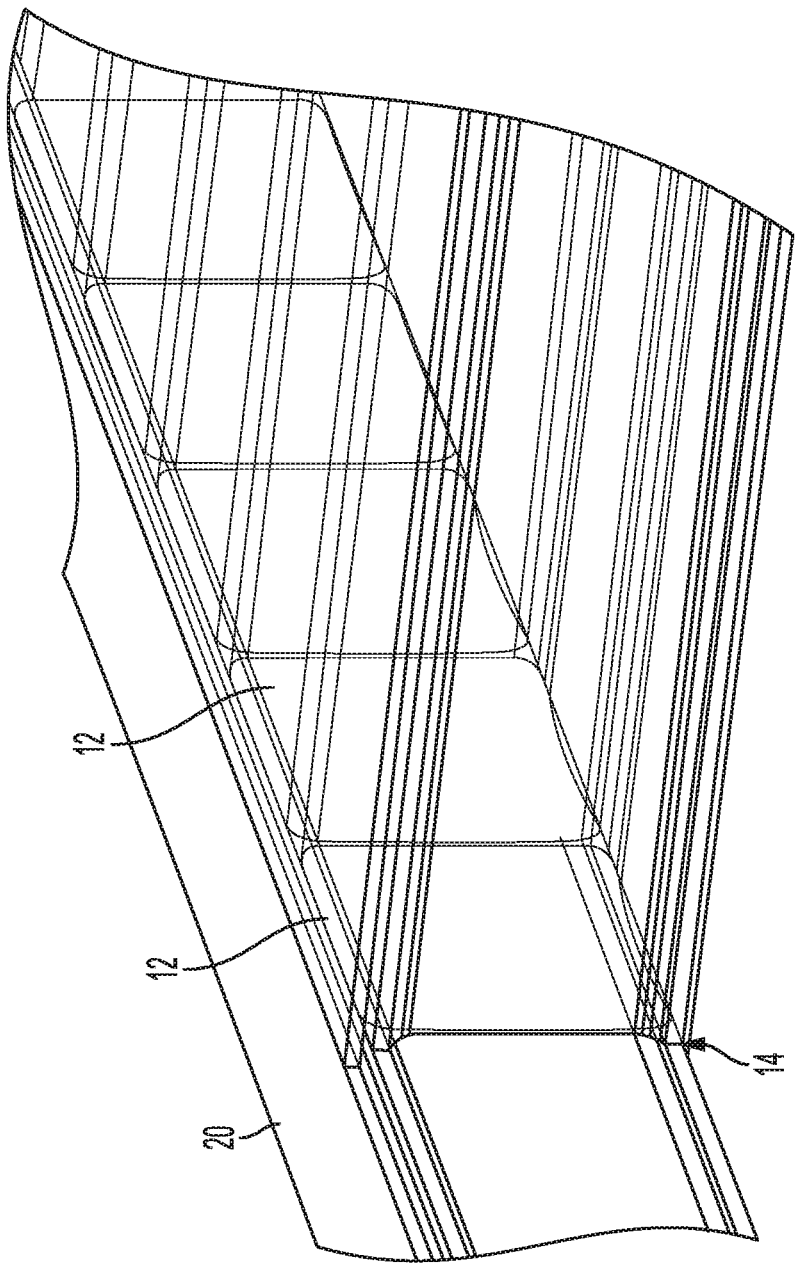
FIG. 2 is a perspective view showing a portion of the panel structure of FIG. 1 with the cross members shown in shadow or transparent form.

In FIG. 1, a panel structure 10 according to one or more embodiment is shown. According to one or more embodiment, the panel structure 10 includes a plurality of cross members 12 and an end cap 20. The cross members 12 are arranged in parallel and aligned by the end cap 20, then welded together using an appropriate welding process (for example, friction stir welding). The outer edges of each of the cross members 12 may contain beveled or hollow areas, as shown in FIGS. 1 and 2. The beveled or hollow areas are part of the distinct geometry of the cross members 12 that results from the process of extruding the aluminum to manufacture the cross members 12.

Figure 4:
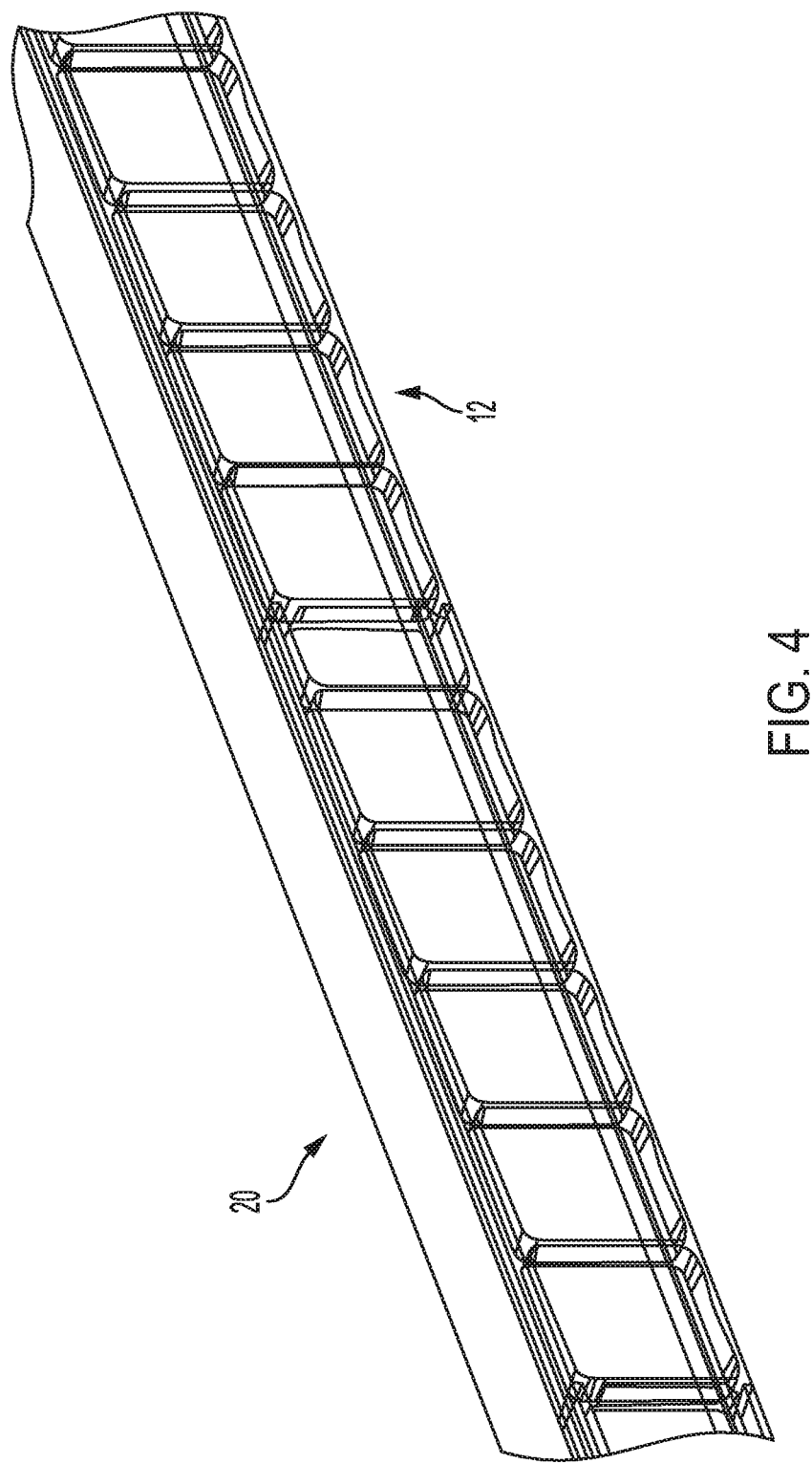
FIG. 4 is a cross-sectional perspective view of the panel structure of FIG. 1, taken along the line 4-4 in FIG. 1.

According to one embodiment, as shown in FIGS. 2 and 4, the end cap 20 is inserted into the openings 14 of each of the cross members 12. According to one embodiment, the end cap 20 has a flange 24 which includes a chamfered portion 22 located on its outer edge. The flange may form a closed shape (e.g., square, etc.) that matches the shape of the hollowed out section or opening 14 in each of the cross members 12. The chamfered portion 22 allows the end cap 20 to be easily inserted into and fit within the opening 14 of each of the cross members 12. Specifically, the chamfered portion 22 allows the end cap 20 to accommodate cross members 12 that have a non-ideal geometry. For example, because of the chamfered portion 22, the end cap 20 can accommodate cross members 12 that do not have a flatness or size according to certain specifications or criteria. Once the end cap 20 is inserted into the cross members 12 and the end cap 20 is pressed into place, the cross members 12 conform to the shape of the end cap 20. In other words, by inserting the end cap 20 into the cross members 12, the cross members 12 straighten and align with the shape of the end cap 20, potentially having the cross members 12 meet the required specification and tolerance.

Figure 5:
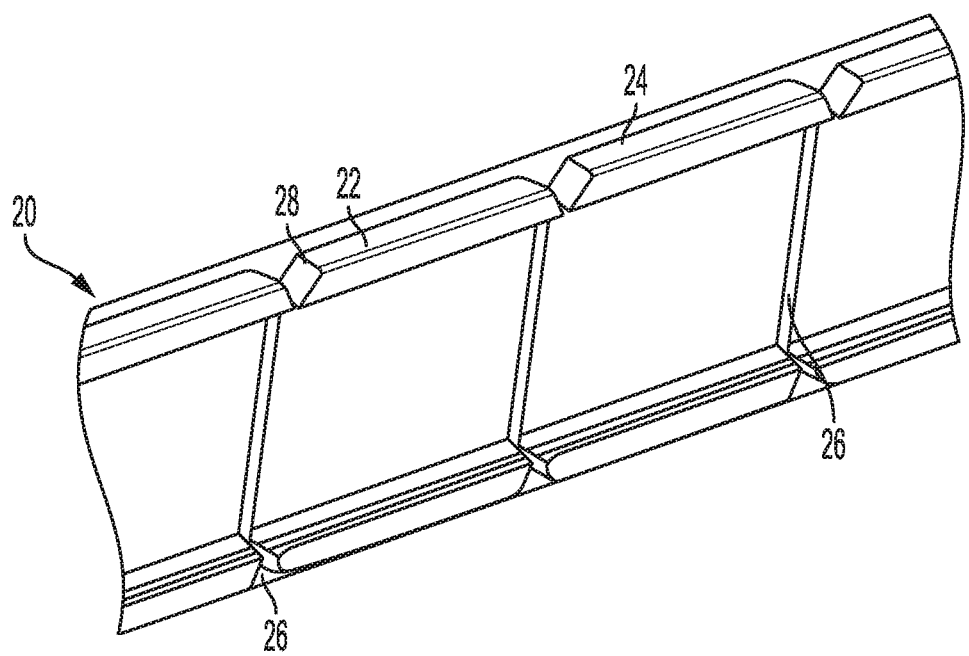
FIG. 5 is a perspective view of a portion of the end cap of FIG. 4.

FIG. 5 illustrates a perspective view of a portion of the end cap 20. As shown in FIG. 5, the end cap 20 may include multiple flanges 24 (e.g., both upper and lower flanges) and may also include clearance slots 26 between the flanges 24. The clearance slots 26 may each be configured to receive a vertical webbing member 13 from one of the cross members 12. The flanges 24 may include tapered edges 28 to guide one of the plurality of webbing members 13 into position in a corresponding clearance slot 26 between the flanges 24. The clearance slots 26 may be built into the chamfered portion 22 of each of the flanges 24. The relief slots or clearance slots 26 may provide even more flexibility for the end cap 20, and help to prevent the internal features (e.g., webbing members 13) of the cross members 12 from interfering with the assembly of the panel structure 10.

Figure 8:
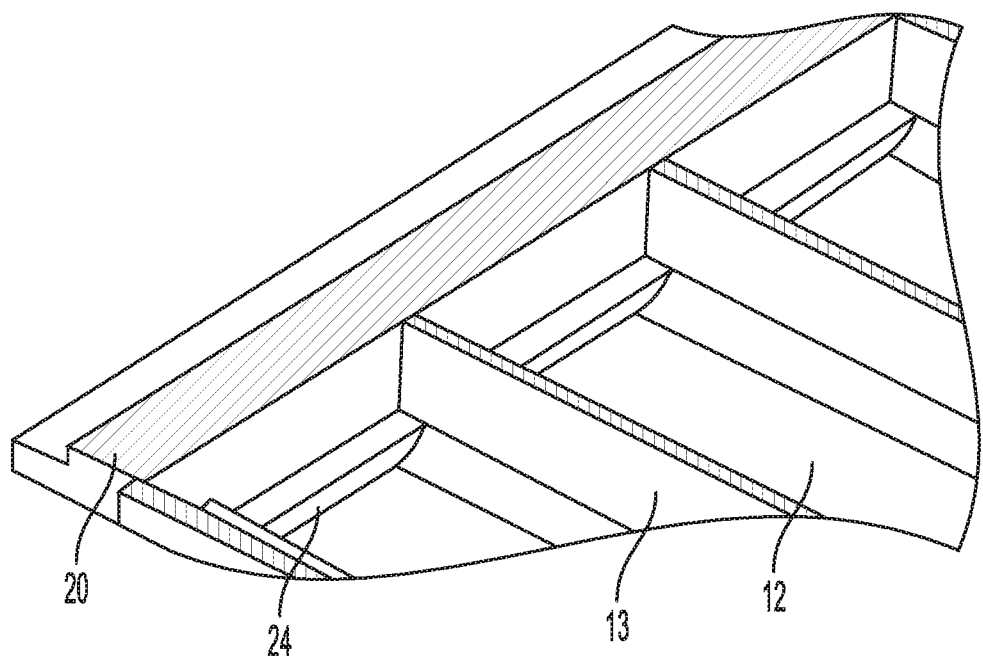
FIG. 8 is a cross-sectional view of a portion of the panel structure of FIG. 1 taken along the line 8-8 of FIG. 7.

FIG. 8 shows a sectional view of a pallet assembly with the webbing members 13 positioned in the clearance slots 26 of the end cap 12.

FIG. 4 shows a cross-sectional view of the panel structure 10 taken along the line A-A in FIG. 1. In FIG. 4, the ends of the end cap 20 can be clearly seen when inserted into the ends of the cross members 12. As shown in FIG. 4, once the end cap 20 has been inserted into the cross members 12, the cross members 12 conform to the shape of the end cap 20, and straighten and align with the shape of the end cap 20.

Figure 6:
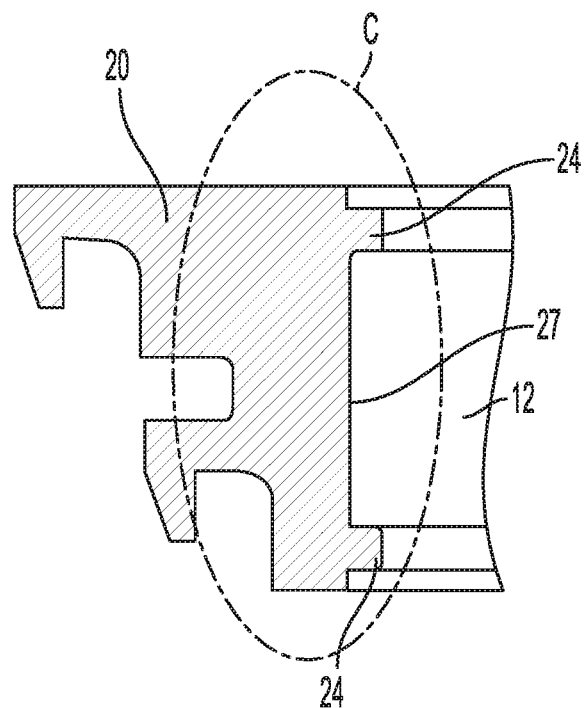
FIG. 6 is a cross-sectional end view of the end cap taken along line 6-6 of FIG. 1.
Figure 7:
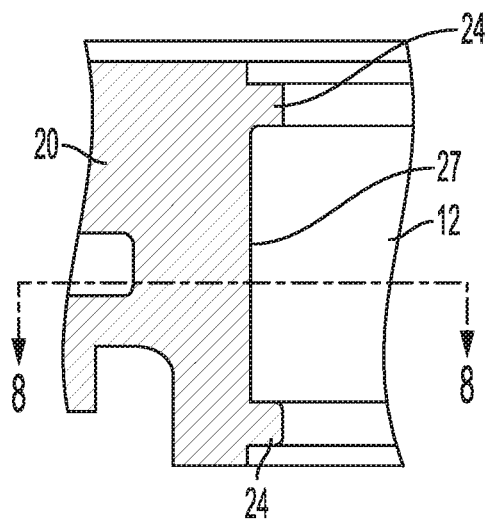
FIG. 7 is a close-up view of the end cap of FIG. 6.

The sectional shape of the end cap 20 may vary according to one or more embodiments. For example, a "C" or "E" shape may be employed. Alternatively, as shown in FIGS. 6 and 7 a more complex shape may be used. Preferably, the end cap 12 includes a planar surface 27 facing the cross members 12. The flanges 24 are located to be protruding from the planar surface 27. The rear side of the end cap 20 (i.e., opposite of the planar surface 27) may have a more complex geometry to facilitate grasping or positioning the end cap 20, for example.

Figure 3:
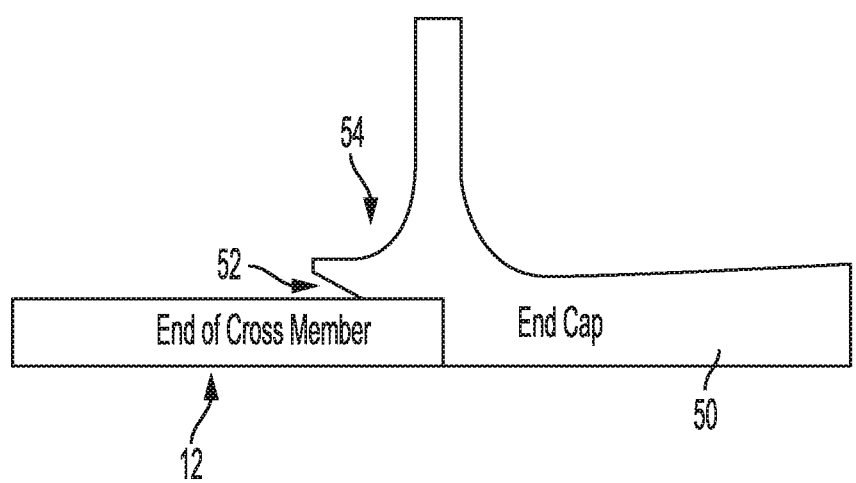
FIG. 3 is a cross-sectional end view showing an exemplary embodiment of the connection between an alternate embodiment of the end cap and a cross member.

FIG. 3 discloses an alternative embodiment of an end cap 50. As shown in the partial sectional view, the alternate end cap 50 includes a flange 54 with a tapered surface 52 to facilitate assembly of the end cap with the cross members 12.

The end cap 20 disclosed in the present application provides several benefits and advantages over previous end caps, including a faster welded panel assembly, faster weld joint alignment during set-up, fewer pre-weld checks for joint fit-up variations, fewer welds, better alignment resulting in fewer weld defects, reduced panel distortion because of better fit-up, increased ability to accommodate looser tolerances and non-ideal geometry, a reduced need for external clamping, and flatter members and panels.

Although the above disclosure has been presented in the context of exemplary embodiments, it is to be understood that modifications and variations may be utilized with departing form the spirit and scope of the invention, as those skilled in the art will readily understand. Such modifications and variations are considered to be within the purview and scope of the appended claims and their equivalents.

It is also important to note that the construction and arrangement of the elements of the structure as shown and described in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the exemplary embodiments without departing from the spirit of the present subject matter.

What is claimed is:

1. A panel structure comprised of aluminum structural members connected together, wherein the structural members include:
    a plurality of hollow cross members, wherein each of the plurality of cross members is parallel to the other cross members in the plurality of cross members and includes an opening at each end; and
    at least one end cap member positioned orthogonally to each of the plurality of cross members and connected to one of the ends of each of the plurality of cross members,
    wherein the at least one end cap member includes a plurality of flanges, wherein each of the plurality of flanges includes a chamfered portion, and
    wherein the chamfered portion of each of the plurality of flanges is located in the opening at the end of a corresponding cross member and the cross members are configured to straighten and align with the shape of the end cap to facilitate welding of the cross members together;
    wherein the at least one end cap member includes a gap between each of the plurality of flanges and wherein each gap is configured to receive a vertical webbing member from one of the plurality of cross members; and
    wherein each of the plurality of flanges includes tapered edges alongside the gaps to facilitate the positioning of a vertical webbing member between the plurality of flanges.

2. The panel structure of claim 1, wherein the structural members are made of extruded aluminum.

3. The panel structure of claim 1, wherein the at least one end cap member retains and aligns the cross members in position without the use of externally applied fixtures.

4. The panel structure of claim 1, wherein each of the plurality of cross members includes outer edges with beveled areas.

5. The panel structure of claim 1, wherein each of the flanges forms a closed shape configured to match the cross-sectional shape of the end of the at least one of the plurality of cross members.

6. A panel structure comprising aluminum structural members configured to be connected together by a friction stir welding process, wherein the structural members include:
    a plurality of cross members, wherein each of the plurality of cross members is parallel to the other cross members in the plurality of cross members and includes an opening at each end; and
    at least one end cap member positioned orthogonally to each of the plurality of cross members and connected to one of the ends of each of the plurality of cross members,
    wherein the at least one end cap member includes a plurality of flanges,
    wherein each of the plurality of flanges includes a chamfered portion, and
    wherein the chamfered portion of each of the plurality of flanges fits within the opening at the end of a corresponding cross member and the cross members are configured to straighten and align with the shape of the end cap to facilitate welding of the cross members together; and
    wherein each of the flanges forms a closed shape configured to match the cross-sectional shape of the end of the at least one of the plurality of cross members.

7. The panel structure of claim 6, wherein the structural members are made of extruded aluminum.

8. The panel structure of claim 6, wherein the at least one end cap member retains and aligns the cross members in position without the use of externally applied fixtures.

9. The panel structure of claim 6, wherein each of the plurality of cross members includes outer edges with beveled areas.

10. The panel structure of claim 6, wherein the at least one end cap member includes a gap between each of the plurality of flanges and wherein each gap is configured to receive a vertical webbing member from one of the plurality of cross members.

11. The panel structure of claim 10, wherein each of the plurality of flanges includes tapered edges alongside the gaps to facilitate the positioning of the vertical webbing member between the plurality of flanges.

12. A panel structure comprising aluminum structural members configured to be connected together by a friction stir welding process, wherein the structural members include:
    a plurality of hollow cross members, wherein each of the plurality of cross members is parallel to the other cross members in the plurality of cross members and includes an opening at each end; and
    at least one end cap member positioned orthogonally to each of the plurality of cross members and connected to an end of each of the plurality of cross members, wherein the at least one end cap member includes a plurality of flanges, wherein each of the plurality of flanges includes a chamfered portion, and wherein the chamfered portion of each of the plurality of flanges is located within an opening at the end of a corresponding cross member so that and the cross members are configured to straighten and align with the shape of the end cap to facilitate welding of the cross members together; and
    wherein each of the plurality of cross members includes outer edges with beveled areas.

13. The panel structure of claim 12, wherein the structural members comprise extruded aluminum.

14. The panel structure of claim 12, wherein the at least one end cap member is configured to retain and align the cross members in position during the friction stir welding connection process without the use of externally applied fixtures.

15. The panel structure of claim 12, wherein the at least one end cap member includes a gap between each of the plurality of flanges and wherein each gap is configured to receive a vertical webbing member from one of the plurality of cross members.

16. The panel structure of claim 15, wherein each of the plurality of flanges includes tapered edges alongside the gaps to facilitate the positioning of a vertical webbing member between the plurality of flanges.

* * * * *